D. W. SEXTON.
Call Bell.
No. 42,604.
Patented May 3, 1864.
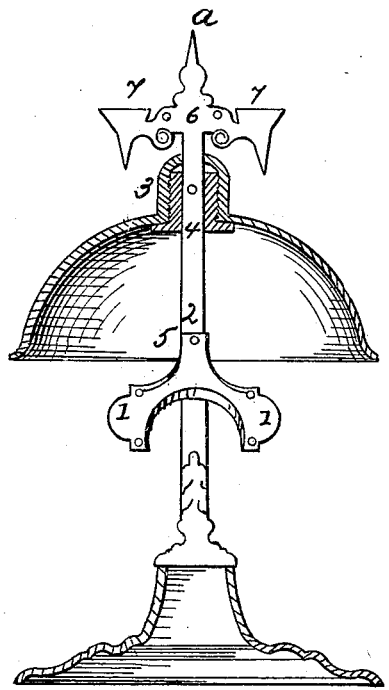
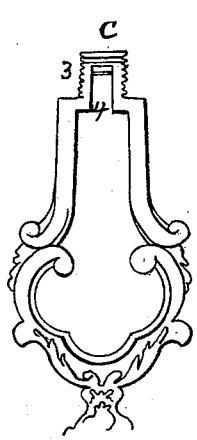
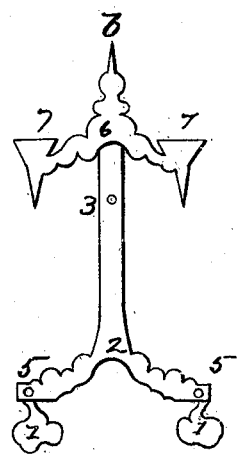
Witnesses
Leverett J. Sexton
Chark Stirng
Deming
Inventor
W. Sexton

UNITED STATES PATENT OFFICE.

DEMING W. SEXTON, OF EAST HAMPTON, CONNECTICUT.

IMPROVED CALL-BELL.

Specification forming part of Letters Patent No. 42,604, dated May 3, 1864.

*To all whom it may concern:*

Be it known that I, DEMING W. SEXTON, of East Hampton, in the county of Middlesex, in the State of Connecticut, have invented a new and Improved Call-Bell; and I do hereby declare that the following is a full, clear, and exact description of my invention, reference being had to the accompanying drawings, forming a part of this specification, in which—

Figure *a* represents all the parts of the bell. Fig. *b* represents clapper and clapper-stem and finger-bar. Fig. *c* represents the upper end of the ornamental stand. Fig. 1 represents the clapper. Fig. 2 represents the clapper stem. Fig. 3 represents the fulcrum. Fig. 4 represents the slot in the upper end of the ornamental stand. Fig. 5 represents the joint attaching the clapper to clapper-stem. Fig. 6 represents the finger-bar for striking the bell. Fig. 7 represents the knobs on the finger bar.

I will now proceed to describe the different parts of my invention, and the manner of operating the bell.

The clapper-stem, Fig. 2, extends from clapper, Fig. 1, upward to finger-bar, Fig. 6, forming a simple lever, Fig. 3, the fulcrum being a pivot on which it swings, and Fig. 7 being knobs where the power is applied for striking the bell on either side. The pivot or fulcrum is placed above the body of the bell in order to get a short motion when the power is applied in striking the bell.

Fig. 1, *a*, represents a long horizontal clapper, and Fig. 1, *b*, represents a double clapper, thus made to shorten the motion of the finger-bar, Fig. 6. Each clapper is joined to its stem by means of a joint operating in such manner as to prevent said clapper from remaining in contact with the bell to muffle the sound after striking. An ornamental finger-bar, Fig. 6, is screwed to the upper end of clapper-stem, Fig. 2, above the body of the bell, being horizontal in order to make the finger motion downward in operating the bell. At either end of this finger-bar is a knob upon which to place the finger in striking the bell.

What I claim as my invention, and desire to secure by Letters Patent, is—

The combination of a double-knobbed horizontal finger bar with a doubled clapper suspended by a pivot above the body of the bell, substantially as set forth, and for the purpose specified.

DEMING W. SEXTON.

Witnesses:
CLARK STRONG,
L. S. SEXTON.